Figure 1:
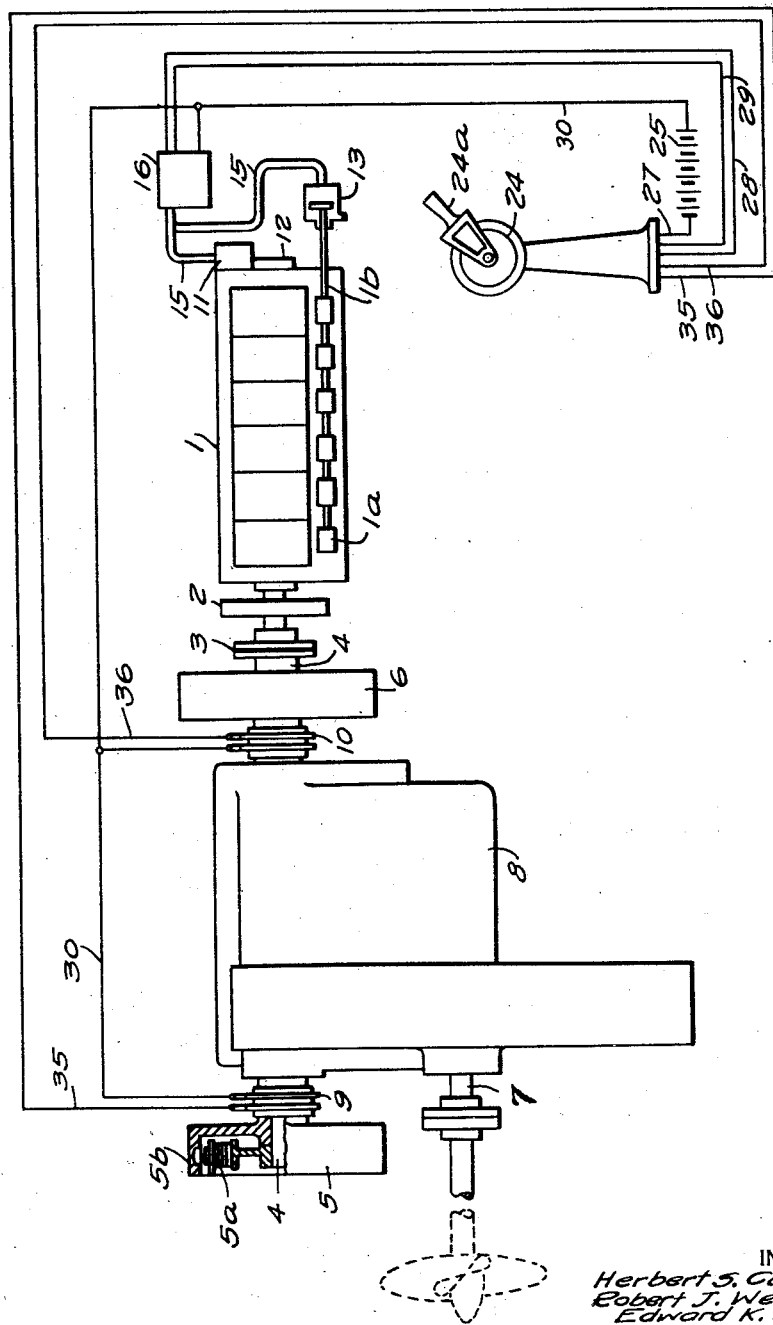

Oct. 7, 1947.     H. S. CARNEGIE ET AL     2,428,553
SHIP PROPULSION POWER PLANT
Filed Jan. 22, 1944     2 Sheets-Sheet 1

INVENTORS
Herbert S. Carnegie,
Robert J. Welsh and
Edward K. Wood.
BY
Paul E. Friedemann
ATTORNEY

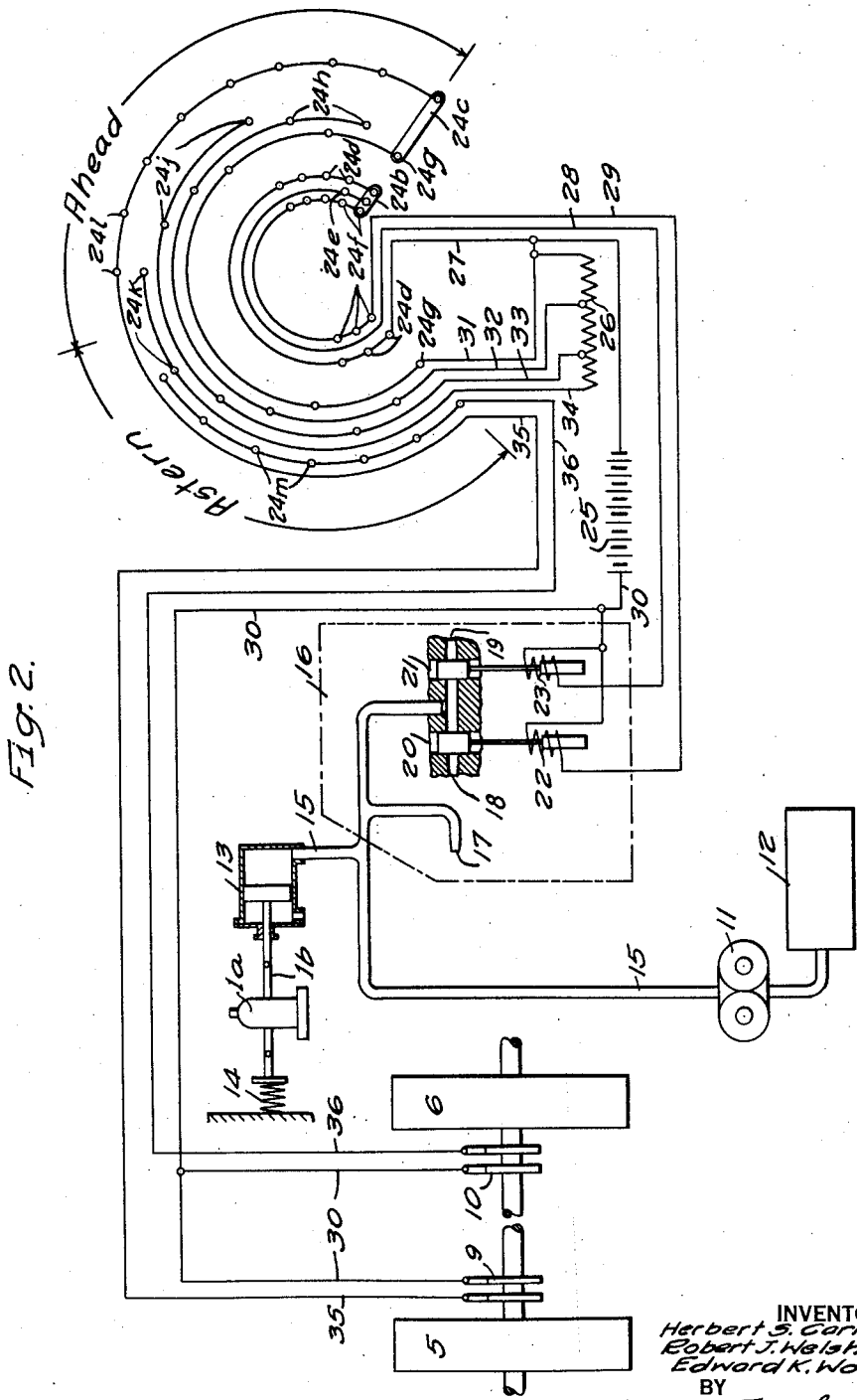

Patented Oct. 7, 1947

2,428,553

UNITED STATES PATENT OFFICE 2,428,553

SHIP PROPULSION POWER PLANT

Herbert Stirling Carnegie, Stafford, Robert James Welsh, Rugby, and Edward Kemp Wood, Stafford, England, assignors to The English Electric Company Limited, London, England, a company of Great Britain Application January 22, 1944, Serial No. 519,303
In Great Britain January 27, 1943

2 Claims. (Cl. 172—284)

This invention relates to ship propulsion power plant wherein a reciprocating internal combustion or other engine or prime mover drives the propulsion shaft through an electro-magnetic slip coupling, wherein torque is transmitted with continuous slip by the electro-magnetic interaction of a primary field system with a secondary system when current is induced in the latter by relative movement between the primary system and the secondary system.

A wide range of speed is not readily obtainable by means of a reciprocating I. C. engine and moreover there are certain critical engine speeds which should be avoided. Variation of propeller speed at constant engine speed could be obtained by varying the slip of an electro-magnetic slip coupling but an increase in the slip of such a coupling is accompanied by a corresponding increase in the energy dissipated in the coupling which is not only uneconomical but may involve difficulties in cooling the coupling.

The present invention takes advantage of two facts. In the first place, the horsepower required to drive the screw propeller varies approximately directly as the cube of the speed of rotation of the propeller; consequently owing to the reduction in torque and horsepower transmitted by the coupling on an increase in the slip thereof, the energy to be dissipated in the coupling on an increase of slip is less than would have to be dissipated if the load driven required, for example, a constant torque. In the second place and for the same reason, the energy dissipated in the coupling for a given slip can be reduced by decrease of engine speed.

The present invention consists broadly in ship propulsion power plant including an engine which can drive the propulsion shaft through an electromagnetic slip coupling of the type set forth, in combination with control means adapted to vary the ship speed by varying both the speed of the engine and the excitation of the primary field system of the coupling.

Change of propeller speed over a range may be obtained by alternate variation of engine speed and coupling excitation; according to a further feature of the invention, the controlling arrangements are so proportioned that the engine is not steadily run at a critical speed, a propeller speed corresponding to this engine speed with full excitation of the slip coupling being obtained if desired by running the engine at a higher speed but with the coupling excitation so reduced that the coupling slip is such as to give the propeller the desired speed.

The invention is illustrated by the accompanying drawings of which Fig. 1 is an external view of a complete power plant and bridge control therefor, all according to the invention, this figure showing the electrical connections between the transmitter on the bridge and the rest of the plant, while Fig. 2 shows in more detail the electrical connections and the speed governing arrangements shown only in external view in Fig. 1.

As shown in Fig. 1, the prime mover 1 consisting of a multi-cylinder Diesel engine having a conventional form of adjustable fuel injection pump 1a for each cylinder and a common fuel input adjusting rack 1b and a flywheel 2 is coupled by the coupling 3 to the input shaft 4. Secured to the latter shaft are the input members of two electro-magnetic slip couplings 5 and 6. The output member of one of these couplings drives the output shaft 7 in the ahead direction through forward gearing in the gear box 8, while the output member of the other of these couplings drives the output shaft 7 in the astern direction through reverse gearing in the gear box 8 shown in external view.

The electro-magnetic slip coupling 5 is shown in part section while the coupling 6 which is of similar construction is shown in external view. The member 5a of the coupling 5 is a field system provided with poles and a field winding which can be supplied through sliprings 9 from a source of supply as hereinafter explained. The other member 5b of this coupling is a secondary system comprising a magnetic core in which eddy currents can be induced. This well-known type of coupling transmits torque with a continuous slip as a result of the interaction of the field produced by the field system 5a with the current induced in the secondary system 5b by their relative motion and this slip can be varied by varying the excitation of the field system. The field winding of the similar coupling 6 is supplied through sliprings 10.

The speed governing arrangement for the Diesel engine 1 is shown by way of example as of the conventional fluid type. The pump 11 shown in external view in Fig. 1 and in more detail in Fig. 2 is driven by the engine and pumps fluid from the reservoir 12 at a rate depending upon the engine speed. This fluid is supplied to the fluid pressure servo-motor 13 coupled to and actuating the fuel rack 1b. For simplicity only one of the fuel injection pumps 1a is shown in Fig. 2. The rack 1b is biassed by the spring 14 to the position corresponding to maximum fuel injection and can be moved by the application of fluid pressure to the servo-motor 13 in a direction to reduce the quantity of fuel injected per cycle. The connecting pipe 15 from the pump 11 to the servo-motor 13 goes also to the speed regulator 16. The latter comprises the fluid escape vents 17, 18 and 19 of which the latter two are controlled respectively by the valves 20 and 21 movable to the open position by energising the operating magnets 22 and 23 respectively as shown in Fig. 2.

The speed of the output shaft 7 is remotely controlled from the bridge by the transmitter 24 which is shown in external view in Fig. 1 and which can control and vary the speed of the engine 1 and the excitation and hence the slip of the electro-magnetic slip couplings 5 and 6, the electrical connections within the transmitter 24 for this purpose being shown in Fig. 2. The arrangement includes the source of electric supply 25 and the tapped regulating resistance 26.

The transmitter handle 24a shown in Fig. 1 can impart arcuate movement to the brushes 24b and 24c shown in Fig. 2. The brush 24b can be moved to any one of a number of positions in which it can engage fixed contact studs 24d connected by line 27 to one side of the source of supply 25, contact studs 24e connected by line 28 to magnet 23 and studs 24f connected by line 29 to magnet 22. The circuit through these two magnet windings is completed by line 30 to the other side of the source of supply 25. The brush 24c can be moved with the brush 24b to any one of a number of positions to engage studs 24g, 24h, 24j and 24k connected by lines 31, 32, 33 and 34 to points on the resistance 26, one end of which is connected to line 27. This brush can also engage studs 24l and 24m connected by lines 35 and 36 respectively to the sliprings 9 and 10 respectively in connection with the field windings of couplings 5 and 6 respectively, the circuit for these field windings being again completed by line 30 to source 25.

In operating the plant, the bridge transmitter 24 is moved from an off position in the ahead direction until brush 24c in the first position bridges together a stud 24k and a stud 24l, the brush 24b in this position not engaging any of the studs. The field winding of the ahead coupling 5 is thus connected across the supply 25 in series with the whole of the resistance 26 to apply minimum excitation to the coupling whereby the output shaft 7 is driven by the engine 1 in the ahead direction with maximum slip. The pump 11 supplies fluid to pipe 15 which fluid can escape by the vent 17 which is in such a conventional governing arrangement so proportioned that the drop of pressure is equal to the pressure required to be applied to the servo-motor 13 to overcome the biassing force of the spring 14 and hold the fuel rack 1b in the minimum fuel position whereby the engine runs at minimum speed. On any increase in engine speed the quantity of fluid pumped by the pump 11 will increase and in order for this to escape by the vent 17 a greater pressure will be required and accordingly the servo-motor 13 will move the fuel rack 1b against the force of spring 14. This will increase the pressure of the fluid in the servo-motor 13 but at the same time will decrease the fuel supply to the engine and decrease the speed of the engine and pump 11 until equilibrium is again reached, i. e. until the fluid escapes from the vent 17 at the same rate as fluid is pumped into the pipe 15. Similarly on any decrease of engine speed the pump 11 pumps less fluid into the pipe 15 and the spring 14 drives the fuel rack 1b against the force of servo-motor 13 to increase the engine speed. The arrangement thus functions to maintain a substantially constant engine speed which is the lowest or idling speed. This arrangement is the conventional fluid governor system and does not in itself form any part of the present invention.

To increase the speed of the output shaft the brushes are moved to another position in which the brush 24c engages a stud 24j and a stud 24l or a stud 24h and a stud 24l whereby the field winding of the coupling is connected to the source 25 with less of the resistance 26 in circuit or to a stud 24g and a stud 24l whereby the whole of the resistance 26 is cut out of circuit. The excitation of the coupling is thus increased and the slip decreased.

In another position the brush 24b engages a stud 24d and a stud 24f thereby completing a circuit from the source 25 through the coil 22 and opening the valve 20. This puts the vent 18 in parallel with the vent 17 and is equivalent to enlarging the total vent area and reducing the pressure drop. Accordingly the condition of equilibrium will now be reached at a lower pressure in the servo-motor 13 and the governing arrangement will tend to maintain a higher engine speed. At the same time the brush 24c may engage a stud 24j and a stud 24l thereby connecting a part of the resistance 26 in the field circuit of the coupling and operating the coupling not at the minimum but at an intermediate value of excitation. In yet another position the brush 24c can engage a stud 24d, a stud 24e and a stud 24f, thereby completing circuits for magnets 22 and 23 and opening the two additional vents 18 and 19 by means of valves 20 and 21. This causes the engine to run at its highest speed. Two or more propeller speeds may be obtained for any intermediate engine speed or stop speed of the engine by providing positions in which the brush 24b engages the appropriate studs for maintaining a particular engine speed and in which the brush 24c engages studs to provide different values of coupling excitation.

To provide for various astern speeds the movement of the handle 24a in the reverse direction causes the brush 24c to engage various studs 24l and 24g, 24h, 24j and 24k, thereby applying different degrees of excitation to the reverse electromagnetic slip coupling 6 while the brush 24b again engages studs to provide for different engine speeds.

Since the energy dissipated in the coupling for a given slip decreases rapidly with decrease of engine speed, it is an important feature of the invention that the control arrangement provides only for intermediate and maximum excitation of the coupling at higher engine speeds while providing for minimum excitation of the coupling at lower engine speeds. The actual arrangement of studs shown by way of example in Fig. 2 provides for increasing the speed from minimum speed first of all by progressive increase of the excitation of the coupling up to the maximum, then an increase in engine speed combined with an increase in coupling slip which yields nevertheless an increase in the speed of the output shaft 7 and then further progressive increase of coupling excitation to give still higher output speeds and so on. A further important feature of the invention, however, is a choice of engine speeds so that the engine does not run at any of its critical speeds, the coupling excitation being so adjusted that for any particular position of the handle 24a the desired propeller speed is obtained by the combination of engine speed and slip of the coupling without the engine having to run at a critical speed.

What we claim as our invention and desire to secure by Letters Patent is:

1. In a ship propulsion system, in combination, a prime mover having a drive shaft, an output shaft, a driving connection between the drive shaft and the output shaft, said driving connection including an electro-magnetic slip coupling having a primary winding and a secondary winding, and means for exciting one of said windings with direct current electrical energy, a speed governor mechanism for the prime mover, a ship's speed controlling device for altering the governor setting to obtain any one of a selected number of prime mover speeds, and rheostat means for altering the direct current excitation of the said one of said windings over a predetermined range for each governor setting.

2. In a ship propulsion system, in combination, a prime mover having a drive shaft, an output shaft, a driving connection between the drive shaft and the output shaft, said driving connection including an electro-magnetic slip coupling having a primary winding and a secondary winding, and means for exciting one of said windings with direct current electrical energy, a speed governor mechanism for the prime mover, a ship's speed controlling device for altering the governor setting to obtain ony one of a selected number of prime mover speeds, and rheostat means interconnected with said ship's speed controlling device for altering the excitation of one of the windings to alter the per cent slip for each particular setting of the governor mechanism but at all times within the capacity of the prime mover.

HERBERT STIRLING CARNEGIE.
ROBERT JAMES WELSH.
EDWARD KEMP WOOD.

REFERENCES CITED

The following references are of record in the file of this patent:

UNITED STATES PATENTS

| Number | Name | Date |
|---|---|---|
| 2,367,976 | Thompson | Jan. 23, 1945 |
| 2,223,210 | Hefel | Nov. 26, 1940 |
| 2,258 005 | Durdin | Oct. 7, 1941 |
| 2,286,778 | Winther | June 16, 1942 |
| 1,833,017 | Cutler | Nov. 24, 1931 |

FOREIGN PATENTS

| Number | Country | Date |
|---|---|---|
| 26,574 | Great Britain | May 5, 1910 |